United States Patent [19]
Simkowski

[11] Patent Number: 5,842,818
[45] Date of Patent: Dec. 1, 1998

[54] SINGLE-TO-MULTIPLE LINE CONVEYING SYSTEM FOR UNSTABLE ARTICLES HAVING A NECK RING

[75] Inventor: Donald J. Simkowski, Loveland, Colo.

[73] Assignee: Goldco Industries, Inc., Loveland, Colo.

[21] Appl. No.: 730,134

[22] Filed: Oct. 15, 1996

[51] Int. Cl.⁶ .................................................. B65G 51/02
[52] U.S. Cl. ............................................. 406/88; 406/182
[58] Field of Search ................................ 466/86, 88, 182

[56] References Cited

U.S. PATENT DOCUMENTS

| | | |
|---|---|---|
| 3,523,604 | 8/1970 | Babunovic et al. . |
| 4,274,533 | 6/1981 | Abe . |
| 4,284,370 | 8/1981 | Danler et al. . |
| 4,724,035 | 2/1988 | Mann et al. . |
| 4,822,214 | 4/1989 | Aidlin et al. . |
| 4,938,636 | 7/1990 | Aidlin et al. . |
| 5,028,174 | 7/1991 | Karass . |
| 5,100,265 | 3/1992 | Mirkin . |
| 5,147,153 | 9/1992 | Aidlin et al. . |
| 5,161,919 | 11/1992 | Smith et al. . |
| 5,165,517 | 11/1992 | Auld et al. . |
| 5,246,097 | 9/1993 | McCoy et al. . |
| 5,299,889 | 4/1994 | Langenbeck . |
| 5,501,552 | 3/1996 | Simkowski . |

*Primary Examiner*—Gary C. Hoge
*Attorney, Agent, or Firm*—Robert E. Harris

[57] ABSTRACT

A single-to-multiple line conveying system for conveying unstable articles, such as plastic bottles, having a neck ring. The unstable articles are neck ring supported and are conveyed in single file along a first path established by a first guide unit to second paths established by a plurality of second guide units through a third path established by a third guide unit having a displaceable section to align the third path with successive ones of the second paths by an electric motor actuated in response to an article counter. The unstable articles are air conveyed along the first and second paths with continuous movement of the unstable articles along the third path being effected by a continuously rotating star wheel that spaces the unstable articles and urges the unstable articles toward the displaceable section that includes a mechanical unit, having a continuously moving chain with article engaging finger units thereon, and an air unit for urging the unstable articles from the third path.

26 Claims, 5 Drawing Sheets

5,842,818

SINGLE-TO-MULTIPLE LINE CONVEYING SYSTEM FOR UNSTABLE ARTICLES HAVING A NECK RING

FIELD OF THE INVENTION

This invention relates to an article conveying system, and, more particularly, relates to a single-to-multiple line conveying system for unstable articles having a neck ring.

BACKGROUND OF THE INVENTION

It is oftentimes necessary to convey articles between different locations, such as, for example, moving articles from one location to another in connection with manufacturing and/or filling of articles, or containers. Such articles must sometimes be moved in single line, or file, and at other times must be moved in multiple line or mass, between locations, and conveying systems for effecting article movement between multiple line or mass to single line and/or from single line to multiple line or mass are now well known.

Particular difficulty has been encountered, however, in conveying unstable articles, such as plastic containers or bottles, from one location to another location due to the tendency of such articles to easily tip during movement. Where such articles have a neck ring, it is known that such articles can be moved by providing guides to engage the bottom side of the neck ring and thereby suspend the articles, after which the articles can be moved along the path established by the guides by air directed at the bottle (see, for example, U.S. Pat. Nos. 4,284,370, 4,724,035, 4,822,214, 4,938,636, 5,028,174, 5,100,265, 5,147,153, 5,161,919, 5,246,097, 5,299,889 and 5,501,552).

It is also known to restrain articles, such as plastic bottles, from tilting during air urged movement of the articles in single file by supplying vertically spaced guide members contacting both the top and bottom sides of the neck rings of the articles (see, for example, U.S. Pat. Nos. 4,284,370 and 5,501,552) and/or by providing side members, such as rails, skirts or the like, adjacent to the sides of the articles (see, for example, U.S. Pat. Nos. 4,284,370, 4,822,214, 5,028,174, 5,100,265, 5,161,919 and 5,246,097).

It is likewise known that unstable articles being air conveyed along a path established by guides can be diverted to auxiliary, or other, paths through the use of diverters (see, for example, U.S. Pat. Nos. 4,822,214, 4,938,636, 5,246,097 and 5,501,552), and that various parts of articles can be combined at a combining station receiving at least a part of the article that has been conveyed to the combining station by means of a neck ring support air conveyor and a star wheel conveyor combination (see, for example, U.S. Pat. Nos. 4,724,035 and 5,501,552).

It is also known that plural lines of articles can be combined into a single line through use of star wheels (see, for example, U.S. Pat. Nos. 3,523,604, 4,274,533, and 5,165,517).

SUMMARY OF THE INVENTION

This invention provides a single-to-multiple line conveying system for unstable articles each of which has a neck ring. Unstable articles, such as plastic containers or bottles, having a neck ring, are neck ring supported and are conveyed in single line along a first path established by a first guide unit to a plurality of second paths established by a plurality of second guide units through a third path established by a third guide unit having a displaceable section.

Movement of the displaceable section of the third guide unit, preferably in opposite arcuate directions, is controlled to align the third path with successive ones of the second paths established by the plurality of second guide units. An actuator, preferably an electric motor, controls movement of the displaceable section of the third guide unit, and actuation, or energization, of the electric motor is preferably responsive to an article counter that counts the number of unstable articles passing along the third path from the third guide unit to the second paths of the second guide units.

The unstable articles are preferably air conveyed along the first and second paths, established by the first and second guide units, and are continuously conveyed, or moved, along the third path, established by the third guide unit. The third guide unit includes an article spacer, preferably a continuously rotating star wheel, to space the unstable articles received from the first guide unit and to urge the unstable articles toward the displaceable section of the third guide unit.

The displaceable section includes an article driver, such as a mechanical unit that preferably includes a continuously moving chain, such as an endless chain, having finger units spaced along the chain so that each of the finger units sequentially engages different ones of the spaced unstable articles received from the spacer to continuously urge the unstable articles along the portion of the third path at the displaceable section toward a then selected one of the plurality of second paths established by the second guide units, and the article driver may also include an air unit, if needed, for urging the unstable articles from the third path onto the then selected one of the plurality of second paths.

It is therefore an object of this invention to provide an improved article conveying system.

It is another object of this invention to provide an improved single-to-multiple line conveying system for unstable articles having a neck ring.

It is another object of this invention to provide a single-to-multiple line conveying system for conveying unstable articles having a neck ring along paths established by a plurality of guide units one of which includes a displaceable section.

It is still another object of this invention to provide a single-to-multiple line conveying system for conveying unstable articles having a neck ring with the unstable articles being maintained, during normal operation, in continuous movement while being conveyed from single to multiple paths.

It is still another object of this invention to provide a single-to-multiple line conveying system for conveying unstable articles having a neck ring along a first path established by a first guide unit to a plurality of second paths established by a plurality of second guide units through a displaceable path established by a third guide unit.

It is still another object of this invention to provide a single-to-multiple line conveying system for conveying unstable articles having a neck ring that includes a first guide unit establishing a first path and having an air conveyor for air conveying unstable articles along the first path, a plurality of second guide units each of which establishes a second path and having an air conveyor for air conveying unstable articles along each of the second paths, and a third guide unit establishing a third path at least a portion of which is displaceable and having an article spacer for spacing the unstable articles on the third path and a displaceable section for causing displacement of the displaceable portion of the third path with the displaceable section including an article driver that acts in conjunction with the article spacer to continuously move the unstable articles along the third path and with movement of the displaceable section being controlled by an actuator to align the third path with successive ones of the second paths of the plurality of second guide units.

With these and other objects in view, which will become apparent to one skilled in the art as the description proceeds, this invention resides in the novel construction, combination and arrangement of parts substantially as hereinafter described, and more particularly defined by the appended claims, it being understood that changes in the precise embodiment of the herein disclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
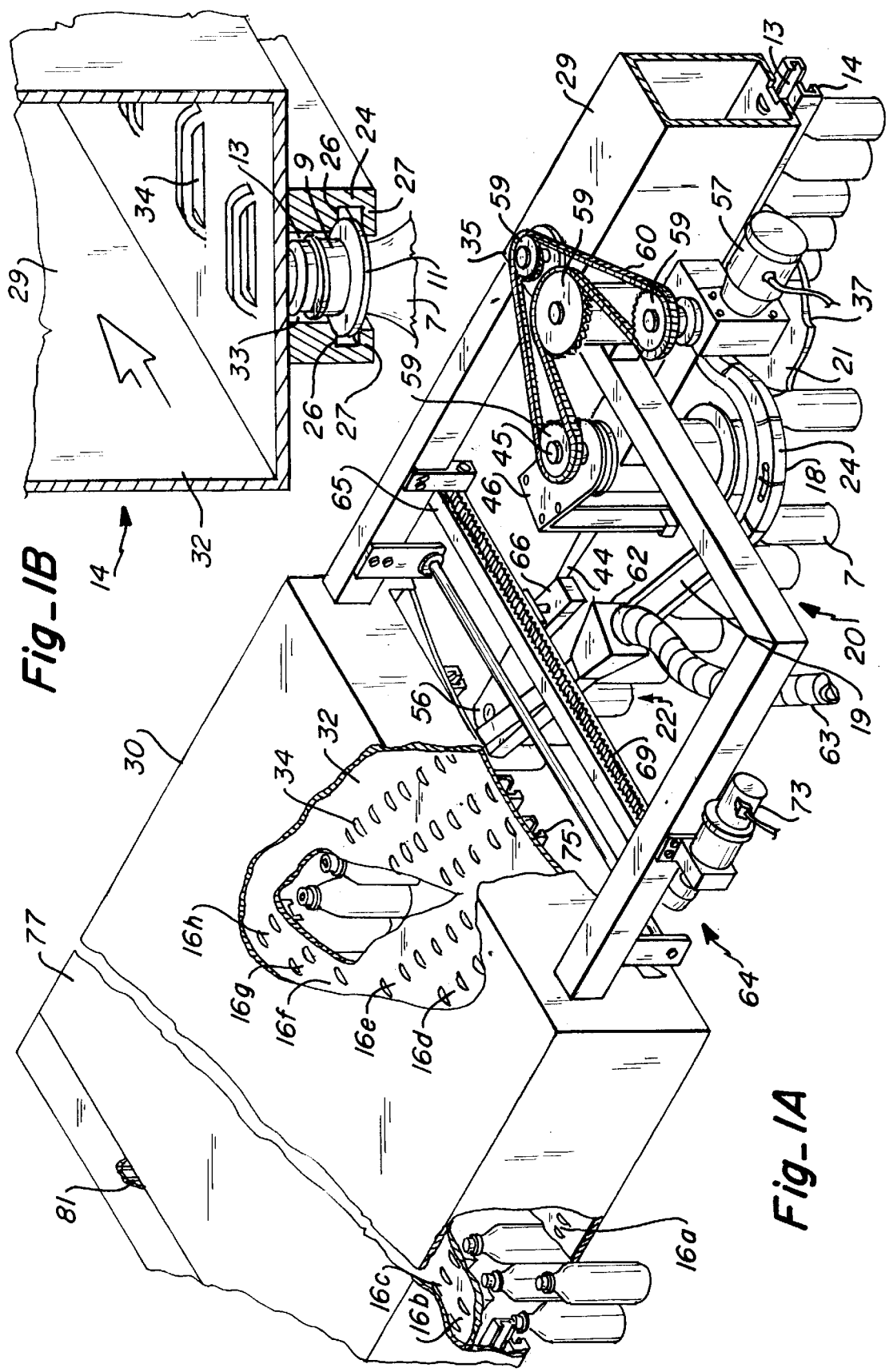
FIG. 1A is a partial perspective view of the system of this invention.
FIG. 1B is a partial perspective view illustrating the air conveying of the neck-ring supported unstable articles.
Figure 2:
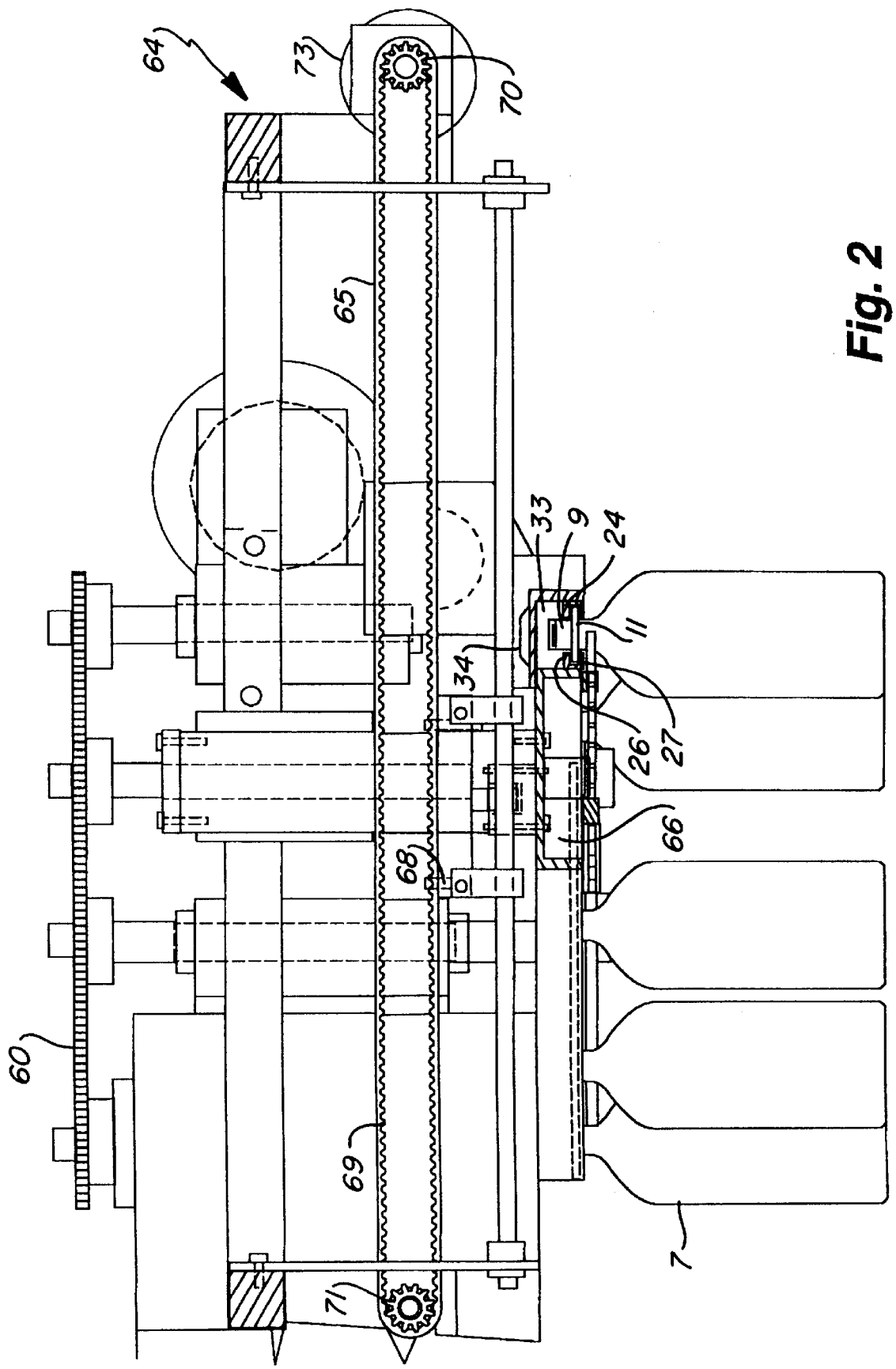
FIG. 2 is a cross-section view taken through lines 2—2 of one of FIG. 4.

As best indicated in FIGS. 1A, 1B, and 2, articles 7 to be conveyed by the system of this invention are unstable articles, such as plastic containers or bottles, having a neck portion 9 with a neck ring 11 thereon.

The unstable articles 7 are conveyed in single file in the downstream direction along first, or input, path 13, established by first, or input, guide unit 14 to multiple second, or discharge, paths 16a–k, established by a plurality of second, or discharge, guide units 17a–k, through third, or middle, path 18, having a displaceable portion 19, established by third, or middle, guide unit 20.

Third guide unit 20 has an article spacer 21 for spacing the unstable articles on the third path and a displaceable section 22 for causing displacement of displaceable portion 19 of the third path to align the third path with a then selected one of second guide units 17a–k.

While ten second guide units 17a–k have been indicated herein, it is to be realized that the exact configuration and/or number is meant to be illustrative, and any plural number (normally more than two) could, for example, be utilized.

As indicated in FIGS. 1A, 3, 4, and 5 all of the guide units (i.e., guide units 14, 17a–k and 20) include guides (neck guides) 24. As indicated in FIGS. 1B and 2, guides 24 are spaced from one another a distance sufficient to receive neck portions 9 of unstable articles 7 therebetween (i.e., guides 24 are horizontally spaced from one another to receive vertically extending neck portions 9 therebetween when the unstable articles, such as plastic bottles as shown in the drawings, are in the upright position) and are engagable with neck rings 11 of the unstable articles to support the unstable articles for movement along the paths established by guides 24 of the guide units.

As best shown in FIG. 1B, guides 24 preferably include two pairs of guide members 26 and 27 with one pair being spaced from the other pair so as to be engagable with opposite edges of neck rings 11 at opposite sides of neck portions 9 of the unstable articles (i.e., with guide members 26 and 27 vertically spaced with respect to one another and with each pair of guide members 26 and 27 horizontally spaced from one another for receiving unstable articles, such as bottles, in the upright position).

By this arrangement (which arrangement is shown, for example, in U.S. Pat. No. 5,501,552), guide members 26 and 27 are spaced from one another a distance just sufficient to allow neck rings 11 of the unstable articles to slide between the guide members with the pairs of guide members being spaced from one another a distance just sufficient to allow neck portion 9 of the unstable articles to pass therebetween.

While not shown, it is meant to be realized, however, that different arrangements of guides and/or guide members could be utilized, at least for some applications, such as, for example, using an arrangement with a single guide at each side of neck portion 9 to support the unstable articles and a conventional side support of some type.

As best shown in FIGS. 1A, 1B, 3 and 5, air conveyors 29 and 30a–k are utilized in conjunction with guides 24 of guide units 14 and 17a–k, respectively, to direct air toward the neck portions of the unstable articles to thereby urge the unstable articles in the downstream direction along the guides.

As indicated, each air conveyor includes air plenum 32, having positive air pressure conventionally established therein (as, for example, by being connected with an air supply source), and air chamber 33, receiving air through apertures 34 from air plenum 32 (with the air directed into air chamber 33 being in the downstream direction to contact the neck portions of the unstable articles to thus urge the unstable articles in the downstream direction along guides 24, as brought out above).

Figure 3:
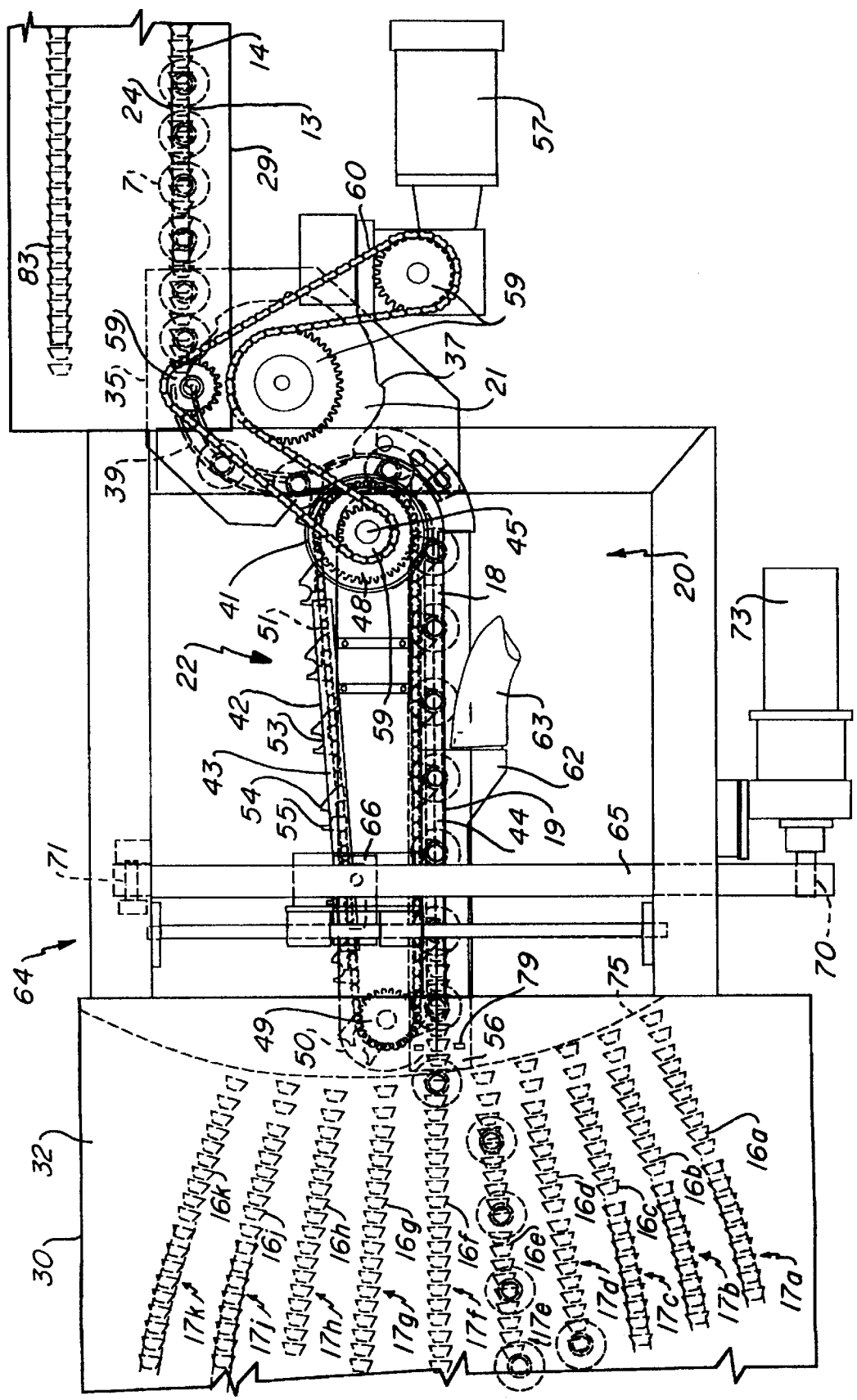
FIG. 3 is a top view of the system as illustrated in FIG. 1.
Figure 4:
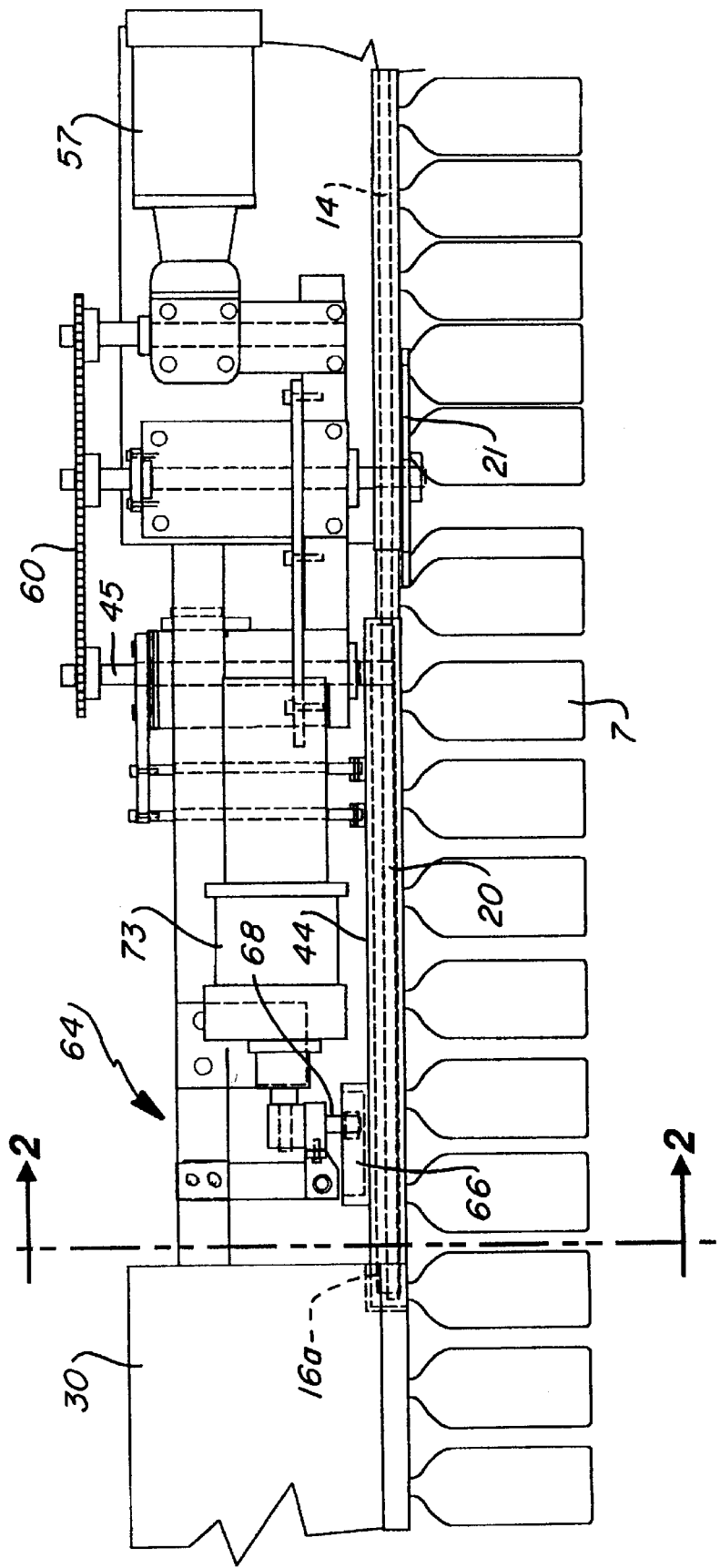
FIG. 4 is a partial side view of the system as shown in FIG. 1.
Figure 5:
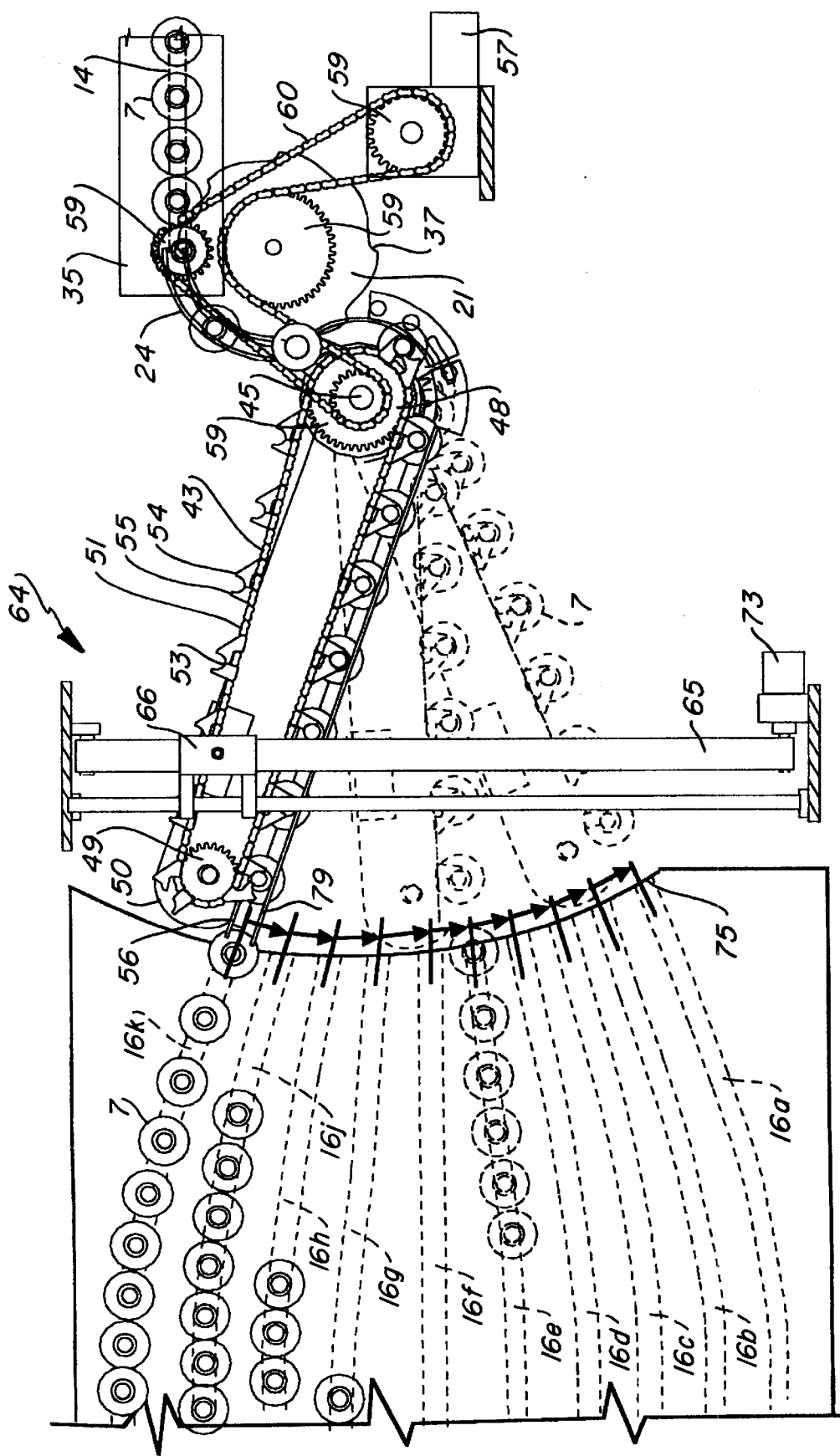
FIG. 5 is a top view similar to that of FIG. 3 but illustrating movement of the displaceable section of the third guide unit to align the third path thereof with successive ones of the second paths established by the plurality of second guide units.

As indicated in FIGS. 1A, 3, and 5, the unstable articles 7 are normally in engagement with one another while being conveyed in single file along guides 24 through first guide unit 14 to the discharge end portion 35 thereof. At discharge end portion 35, the unstable articles are discharged to third guide unit 20, and, more particularly, to article spacer 21 of the third guide unit.

Article spacer 21 is preferably a star wheel having a plurality of arms 37 configured to engage the neck rings of each succeeding unstable article received from first guide unit 14 along the path established by guides 24 at discharge end portion 35 of guide unit 14 (as shown in the drawings, star wheel 21 has eight arms, but it is meant to be realized that this configuration could be modified, as necessary, or desired). Arms 37 of star wheel 21 have a width less than that of the vertical spacing between guide members 26 and 27, where utilized, to allow the star wheel arms to pass between the guide members to engage the neck rings of the unstable articles at discharge end portion 35 of guide unit 14.

Upon engagement of an unstable article by an arm 37 of star wheel 21, the engaged article is received in the pocket formed by arm 37 and further movement of the star wheel engaged article downstream along the path established by guides 24 is controlled by rotation of the star wheel (as shown in FIG. 1, guides 24 at input end portion 39 of third guide unit 20 are partially curved about star wheel 21 to effect a turn somewhat greater than ninety degrees in the path established by the guides so that the path established by guides 24 maintains the unstable articles in engagement with an arm 37 of the star wheel during this turn).

As best indicated in FIGS. 3 and 5, each arm 37 of star wheel 21 is configured to also engage the neck ring of the next succeeding unstable article (i.e., the unstable article immediately following the unstable article then being urged downstream by the star wheel) to prevent movement of the next succeeding unstable article until the star wheel has been rotated a sufficient distance such that the next succeeding unstable article is received in the pocket of the next arm of the star wheel and is thereafter moved downstream by that arm to thus achieve the desired spacing between the unstable articles.

As indicated, star wheel 21 moves the unstable articles along curved guides 24 at input end portion 39 of third guide unit 20 to pivot end portion 41 of displaceable section 22. Displaceable section 22 includes an article driver 42, such as a mechanical unit 43 having an arm 44 pivotably mounted on pivot 45 mounted on support structure 46 at pivot end portion 41 of the displaceable section. Sprocket 48 is mounted on arm 44 at pivot 45, sprocket 49 is mounted at free end 50 of arm 44, and endless chain 51 extends around sprockets 48 and 49 so that driven rotation of sprocket 48 causes the chain to be driven around the sprockets.

Finger units 53, each including a pair of fingers 54 and 55, are mounted on endless chain 51 with each finger unit being spaced from adjacent finger units so that each finger unit successively comes into engagement with a different one of the spaced unstable articles as the unstable articles are moved along guides 24 by star wheel 21.

Sprocket 48 is adjacent to star wheel 21 but is offset therefrom, and curved guides 24, after passing adjacent to star wheel 21, pass between sprocket 48 and star wheel 21 and are curved in the opposite direction partially around sprocket 48 (guides 24 thus follow a generally "S" configuration) to enable engagement of a finger unit 53 with the unstable article as the unstable article is moved around the curved path into the vicinity of sprocket 48.

In this manner, the unstable articles are continuously engaged and thereby continuously urged along the curved path formed by guides 24 with the unstable articles being first engaged by an arm of the star wheel, followed by engagement of the unstable articles with both an arm of the star wheel and a finger unit, and then being engaged only by the finger unit as the star wheel continues to rotate so that the arm moves away from the curved path as the path formed by guides 24 curves in the opposite direction to pass partially around sprocket 48.

As the finger units 53 rotate about sprocket 48, fingers 54 and 55, due to the configuration of the fingers, are spread, or opened, with respect to one another as the chain rotates about the sprocket so that each of the unstable articles successively urged by star wheel 21 toward displaceable section 22 is received between fingers 54 and 55 of successive ones of finger units 53.

As star wheel 21 continues to rotate and the arm engaging the unstable article moves away from the unstable article, trailing finger 55 thereafter urges the unstable article along guides 24. As the finger unit nears completion of its rotation about sprocket 48, fingers 54 and 55 close toward one another, again due to the configuration of the fingers, to grasp the neck portion of the unstable article between the fingers.

The unstable articles are thereafter urged by the finger units, due to movement of chain 51, toward free end 50 of arm 44 of displaceable section 22. As each finger unit starts to rotate about sprocket 49, mounted at free end 50 of arm 44 of the displaceable section, the fingers of the finger unit start to open, or spread, with respect to one another, again due to the configuration of the fingers. As the fingers continue to rotate about sprocket 49, the trailing finger 55 urges the unstable article along guides 24 away from displaceable section 22 of the third guide unit at discharge end portion 56 of the third guide unit toward a then selected one of the second guide units 17a–k.

During normal operation, star wheel 21 and sprocket 48 are continuously rotated by common driver 57, such as an electric motor, through a series of sprockets 59 having chain 60 thereon arranged such that each arm 37 of star wheel 21 delivers an unstable article to a finger unit 53 each time that a finger unit starts to rotate about sprocket 48, as best indicated in FIGS. 3 and 5.

As best indicated in FIGS. 1A and 3, article driver 42 may also include air unit 62, if needed. Air unit 62 is similar in structure to air conveyors 29 and 30a–k of first and second guide units 14 and 17a–k and delivers air, supplied through tube 63, to the neck portions 9 of the unstable articles to urge the unstable articles along the displaceable portion 19 (near the discharge end thereof) of third path 18 to thereby urge the unstable articles from the third path onto the then selected one of the second paths established by the second guide unit.

Controller 64 is utilized to precisely position arm 44, and therefore also precisely position displaceable section 22 of third guide unit 20. Controller 64 includes controller support 65 extending across displaceable section 22 with controller support 65 having carriage 66 slidably mounted thereon so that the carriage moves in reciprocal directions back and forth across control support 65.

Carriage 66 is connected with displaceable section 22 so that movement of carriage 66 causes arm 44 and displaceable section 22 to be pivoted about pivot 45 resulting in arm 44 and displaceable section 22 being moved along an arcuate path (arm 44 and displaceable section 22 are therefore moved along opposite arcuate paths by movement of carriage 66 in opposite directions).

Carriage 66 is connected by connecting arm 68 with chain 69 mounted for rotation about sprockets 70 and 71 near the opposite ends of controller support 65, and sprocket 70 is rotatively driven by electric motor 73 to drive chain 69 and precisely position guides 24 at the discharge end portion 56 of the displaceable section of the third guide unit with a then selected one of the guides of second guide units 17a–k.

As shown in FIG. 1A, 3 and 5, input end portions 75 of second guide units 17a–k are adjacent to one another and guides 24 thereat are curved in an amount necessary to be aligned with guides 24 at discharge end portion 56 of displaceable section 22 of third guide unit 20 to enable and facilitate transfer of the unstable articles from discharge end portion 56 of third guide unit 20 to each one of second guide units 17a–k. As also indicated, guides 24 of guide units 17a–k are brought into substantially parallel relationship with respect to one another downstream of input end portions 75 and are in substantially parallel relationship at discharge end portions 77 of the second guide units.

As best indicated in FIG. 5, guides 24 (establishing displaceable portion 19 of third path 18) of third guide unit 20 are preferably successively and sequentially aligned with guides 24 (establishing second paths 16a–k) of each adjacent one of guide units 17a–k, with the displaceable section of the third guide unit being moved by electric motor 73 preferably first in one arcuate direction until the outer guide unit of guide units 17a–k is reached, and then in the opposite arcuate direction until the opposite outer guide unit is reached, with the alternate directions of displacement of the displaceable section of the third guide unit being continued so long as normal operation is continued.

Article counter 79 is preferably positioned near free end 50 of arm 44 of displaceable section 22 to count the number of unstable articles passed to second guide units 17a–k. Each time that a predetermined count is reached, article counter 79 causes actuation, or energization, of electric motor 73 to shift delivery of unstable articles from a then selected one of second guide units 17a–k to an adjacent one of the second mounting units (the predetermined count is selected with a view toward efficiency of operation, with an unstable article delivery of about eight unstable articles to a then selected second guide unit being now preferred before changing delivery to an adjacent one of the second guide units).

As also indicated in FIG. 1A, releasable stops 81 may be provided near the discharge end portions 77 of each of second guide units 17a–k to selectively stop the flow of articles so that the second guide units thus act as an accumulator. While not shown, it is also to be realized that the unstable articles can be discharged (continuously or in groups if the second guide units act as an accumulator) from the second guide units to a conveyor, such as an air conveyor and/or a belt conveyor, so that the articles are discharged in multiple line or in mass.

In addition, it is to be realized that the unstable articles discharged from the second guide units can be conveyed to a palletizer for palletizing the unstable articles. Due to the number of rows needed for palletizing, a second system, identical to the system described herein, may be utilized in parallel, or side-by-side relationship, with the system described herein, to convey the unstable articles from the input guide unit, such as guide unit 83 as indicated in FIG. 3, to the second guide units with the rows from the second guide units being then conveyed to the palletizer.

In normal operation, star wheel 21 and sprocket 48 (driving chain 51 having finger units 53 mounted thereon) are continuously rotated so that the unstable articles are continuously moved through the system at a relatively high speed.

As can be appreciated from the foregoing, this invention provides a single-to-multiple line conveying system for conveying unstable articles and, particularly, for conveying unstable articles, such as plastic bottles or containers, having a neck ring.

What is claimed is:

1. A conveying system for unstable articles each of which has a neck ring, said system comprising:
    a first guide unit engagable with the neck rings of the unstable articles and establishing a first path for the unstable articles;
    a plurality of second guide units each of which is engagable with the neck rings of the unstable articles and establishing multiple second paths for the unstable articles;
    an article actuator for urging the unstable articles along said first and said second paths established by said first and said second guide units;
    a third guide unit receiving the unstable articles from said first guide unit and continuously urging the unstable articles along a third path, said third path including a displaceable portion with the unstable articles being discharged from said displaceable portion toward said plurality of second guide units; and
    a controller for controlling movement of said displaceable portion of said third path of said third guide unit so that said third path is sequentially aligned with different ones of said multiple second paths of said plurality of second guide units.

2. The system of claim 1 wherein said first path of said first guide unit enables movement of the unstable articles in single file along said first path, and wherein each of said multiple second paths of said plurality of second guide units enable movement of the unstable articles in single file through each of said multiple second paths with said multiple second paths being adjacent to one another.

3. The system of claim 1 wherein said third guide unit also includes an article spacer for spacing adjacent ones of the unstable articles on said third path.

4. The system of claim 3 wherein said article spacer includes a star wheel that continuously rotates during normal operation, said star wheel having arms engagable with the unstable articles on said third path.

5. The system of claim 1 wherein said plurality of second guide units include more than two second guide units each of which establishes a separate one of said multiple second paths.

6. The system of claim 1 wherein said displaceable portion of said third path of said third guise unit is pivoted so that said third path is sequentially aligned with different ones of each of said multiple second paths of said plurality of second guide units.

7. The system of claim 1 wherein said third guide unit includes a displaceable section for causing said movement of said displaceable portion, and wherein said controller includes an electric motor for selectively controlling positioning said displaceable section of said third guide unit so that said displaceable portion of said third path is always aligned with one of said multiple second paths of said plurality of second guide units.

8. The system of claim 7 wherein said controller also includes an article counter for counting the unstable articles moved from said third guide unit to said plurality of second guide units with said article counter controlling actuation of said electric motor.

9. The system of claim 8 wherein said article counter actuates said electric motor each time that a predetermined number of the unstable articles have been moved from said third guide unit to one of said plurality of second guide units.

10. The system of claim 1 wherein said article actuator includes an air supplier for directing air toward said first path of said first guide unit and said multiple second paths of said plurality of second guide units to urge the unstable articles along said first path and said multiple second paths.

11. The system of claim 10 wherein said displaceable section of said third guide unit also includes an air supplier for urging the unstable articles from said displaceable portion of said third path.

12. The system of claim 1 wherein said third guide unit also includes a displaceable section for causing movement of said displaceable portion of said third path of said third guide unit, and wherein said displaceable section includes a driven mechanical unit for urging the unstable articles along said displaceable portion of said third path.

13. The system of claim 12 wherein said driven mechanical unit includes a movable chain having finger units thereon engagable with the unstable articles on said displaceable portion of said third path for urging the unstable articles along said displaceable portion of said third path.

14. The system of claim 13 wherein said chain is a continuously moving endless chain having different ones of said finger units spaced along said chain so that said chain and said finger units are continuously moved along said displaceable portion of said third path during normal operation.

15. The system of claim 14 wherein said finger units include first and second fingers movable between open and closed positions, with said fingers being in said open position to receive the unstable articles on said displaceable portion of said third path and to discharge the unstable articles from said displaceable portion of said third path, and being in said closed position to grip the unstable articles between said first and second fingers to urge the unstable articles along said displaceable portion of said third path.

16. The system of claim 1 wherein the unstable articles are plastic bottles.

17. A single-to-multiple line conveying system for unstable articles each of which has a neck ring, said system comprising:

a first guide unit engagable with the neck rings of the unstable articles and establishing a first single line path for the unstable articles;

a plurality of second guide units each of which is engagable with the neck rings of the unstable articles and establishing adjacent multiple paths for the unstable articles;

an air supplier for directing air toward said first path of said first guide unit and said multiple paths of said plurality of second guide units to urge the unstable articles along said first single line path and said multiple paths;

a third guide unit receiving the unstable articles from said first guide unit, said third guide unit establishing a second single line path at least a portion of which is displaceable, and said third guide unit including an article spacer for spacing the unstable articles on said second single line path and a displaceable section for causing displacement of said displaceable portion of said second single line path with said displaceable section having an article driver that acts in conjunction with said article spacer to continuously move the unstable articles along said second single line path during normal operation with the unstable articles being discharged from said displaceable portion of said second single line path in single line toward said plurality of second guide units; and a controller for controlling movement so said displaceable section of said third guide unit so that said displaceable portion of said second single line path is sequentially aligned with each of said multiple paths of said plurality of second guide units.

18. The system of claim 17 wherein said article driver of said displaceable section of said third guide unit includes at least one of a mechanical unit and an air unit for urging the unstable articles along said displaceable portion of said second single line path.

19. The system of claim 17 wherein said article driver of said displaceable section of said third guide unit includes a mechanical unit for continuously moving the unstable articles along said displaceable portion of said second single line path during normal operation, and wherein said system includes a motor for driving said mechanical unit.

20. The system of claim 19 wherein said article spacer includes a star wheel having arms engagable with the unstable articles on said second single line path, and wherein said star wheel is caused to be continuously rotated by said motor during normal operation.

21. The system of claim 17 wherein said controller causes movement of said displaceable section of said third guide unit along an arcuate path to sequentially align said displaceable portion of said second single line path with each of said multiple paths of said plurality of second guide units.

22. The system of claim 17 wherein said controller includes an electric motor for sequentially positioning said displaceable section of said third guide unit so that said displaceable portion of said second single line path is caused to be sequentially aligned with each next adjacent one of said multiple paths of said plurality of second guide units each time that said electric motor is actuated during normal operation, said controller also including an article counter for counting the number of the unstable articles moved from said second single line path to said multiple paths with said article counter causing actuation of said electric motor whenever said article counter reaches a predetermined count.

23. The system of claim 17 wherein each of said plurality of second guide units includes a movable stop unit for releasably stopping the unstable articles in said multiple paths whereby said plurality of second guide units function as an unstable article accumulator.

24. A single-to-multiple line conveying system for conveying unstable articles each of which has a neck ring, said system comprising:

a first guide unit engagable with the neck rings of the unstable articles and establishing a first single line path for the unstable articles;

a plurality of second guide units each of which is engagable with the neck rings of the unstable articles and establishing adjacent multiple paths for the unstable articles;

an air supplier for directing air toward said first path of said first guide unit and said multiple paths of said plurality of second guide units for urging movement of the unstable articles along said first single line path and said multiple paths;

a third guide unit receiving the unstable articles from said first guide unit and continuously urging the unstable articles along a second single line path having first and second portions, said third guide unit including a rotatable star wheel having arms engagable with the unstable articles at said first portion of said second single line path and a displaceable section causing displacement of said second portion of said second single line path, said displaceable section including a chain having a plurality of finger units thereon with said chain extending along said second portion of said second single line path so that said finger units engage and move the unstable articles along said second portion of said second single line path, and with the unstable articles being discharged from said second portion of said second single line path toward said plurality of second guide units;

an actuator for continuously rotating said star wheel and continuously moving said chain along said second portion of said second single line path during normal operation;

an electric motor for controlling movement of said displaceable section of said third guide unit so that said second portion of said second single line path is moved in an arcuate path for sequential alignment of said second portion of said second single line path with the next adjacent one of said multiple paths established by said plurality of second guide units each time that said electric motor is actuated, said first portion of said second single line path remaining in alignment with said first single line path established by said first guide unit during said movement of said displaceable section of said third guide unit; and an article counter for counting the unstable articles moved from said second portion of said second single line path of said third guide unit to said plurality of second guide units, said article counter causing said electric motor to be actuated each time that said article counter reaches a predetermined count.

25. The system of claim 24 wherein said displaceable section of said third guide unit also includes an air unit connected with an air supply for directing air toward said second portion of said second single line path for urging movement of said unstable articles from said second portion of said second single line path.

26. The system of claim 24 wherein the unstable articles are plastic bottles.

\* \* \* \* \*